United States Patent [19]

Bona et al.

[11] Patent Number: 4,955,643
[45] Date of Patent: * Sep. 11, 1990

[54] CONNECTION FOR FLUIDS

[75] Inventors: Alfredo D. Bona, Abbiategrasso; Attilio Airaghi, Cornaredo, both of Italy

[73] Assignee: Murray Europe S.P.A., Milano, Italy

[*] Notice: The portion of the term of this patent subsequent to Oct. 4, 2005 has been disclaimed.

[21] Appl. No.: 262,999

[22] Filed: Oct. 26, 1988

[30] Foreign Application Priority Data

Dec. 10, 1987 [IT] Italy ............... 22937 A/87

[51] Int. Cl.5 ............... F16L 41/00
[52] U.S. Cl. ............... 285/190; 285/281
[58] Field of Search ............... 285/273, 190, 281, 347

[56] References Cited

U.S. PATENT DOCUMENTS

| | | | |
|---|---|---|---|
| 608,852 | 8/1898 | Goss | 285/190 |
| 2,661,965 | 12/1953 | Parmesan | 285/347 |
| 3,007,485 | 11/1961 | Barker | 285/190 |
| 3,074,748 | 1/1963 | Ulrich | 285/347 |
| 3,967,838 | 7/1976 | Legris | 285/190 |
| 4,142,741 | 3/1979 | Fiala | 285/190 |
| 4,679,829 | 7/1987 | Yanagisawa | 285/190 |
| 4,775,174 | 10/1988 | Bona et al. | 285/190 |

Primary Examiner—Dave W. Arola
Attorney, Agent, or Firm—Bucknam and Archer

[57] ABSTRACT

Connection for fluids comprising a movable hollow joint (1) equipped with a lateral tubular duct (15) and two conical through-holes, opposite and coaxial (2) and (2') whose axis is perpendicular to that of the lateral duct; a clamping screw inserted in the through-holes (2) and (2') of the joint (1). The shank (3) of said screw is provided with a central duct (12) coaxial with the axis of said holes (2), a transversal hole (14) which connects said duct (12) with the internal chamber (13) of the joint and two round grooves (10) and (11) at said through-holes (2) and (2'); and flexible round gaskets (9) and (940) inserted in said grooves (10) and (11).

5 Claims, 1 Drawing Sheet

CONNECTION FOR FLUIDS

This invention refers to a connection for fluids. More in particular, it refers to a connection for fluids with low, medium and high pressure. As noted, in some branches of industry, in particular the motor industry, connection systems are presently used with eye type joints to transport fluids, especially with low, medium and high operating pressure. The seal of these connection systems is guaranteed by a strong clamp torque applied to a screw which compresses the eye joint or connection between two annealed copper washers. In this way a stiff joint is created, watertight to the fluids that flow inside it. While substantially satisfactory from the functional point of view, the above type of joints present the problem of needing a strong clamping torque and a special manual capacity of the operators, who, in the assembly phase, must assemble the parts with a great deal of care and skill before starting to lock them. Consequently, applications times are fairly long and seal is not fully guaranteed. This invention solves the above problems by providing a connection for fluids in which the parts composing it are preassembled to one another, self-centered and ready for immediate use.

SUMMARY OF THE INVENTION

According to this invention, a connection for fluids, in particular for fluids with low, medium and high pressure, with the abovementioned characteristics comprises:

(a) a hollow movable joint of eye type provided with an internal chamber, a lateral tubular duct leading to said chamber, and two opposite coaxial through-holes leading into said chamber, whose axis is substantially perpendicular to that of the tubular duct; said holes having conical shape widening towards the outside;

(b) a clamping screw inserted in the through-holes of the joint whose leg is provided with a central duct coaxial with the axis of said holes and communicating with said chamber by means of at least one transversal hole and perimetral grooves located at said opposite coaxial holes; and (c) flexible round seal gaskets inserted in said perimetral grooves of the clamping screw, at said through-holes. The perimetral grooves may have any shape and size, according to the type of fluid used. For example, said grooves may have semicircular, square or rectangular section, U-shaped with corners connected or with truncated cone shape. The round gaskets are preferably made of elastomeric material and have a preferably circular section, even if any material and section can be used.

The connection of this invention has the following advantages:

(A) all parts forming the connection are pre-assembled to one another, self-centered and in state of immediate use, so the operations and applications times are facilitated and reduced.

(B) Seal among the components is guaranteed by the flexibility and by the deformability and adherence of the gaskets constructed with rings in elastomeric or other suitable material, and by the arrangement of said gaskets between the conic surface of the joint holes and the groove of the clamping screw.

(C) Application of the connection needs no more than a strong clamping torque.

(D) The movable joint can be mounted in any position as it has a perfectly symmetrical structure with respect to the through-plane for the axis of the lateral duct. Asymmetrical structures can also be used according to specific applicative needs.

BRIEF DESCRIPTION OF THE FIGURES OF THE DRAWING

The constructive and operating characteristics of the connection for fluids of this invention can be better understood from the following detailed description in which reference is made to the attached drawings which show a form of construction of this connection, and in which.

DETAILES DESCRIPTION OF AN EMBODIMENT

Figure 1:
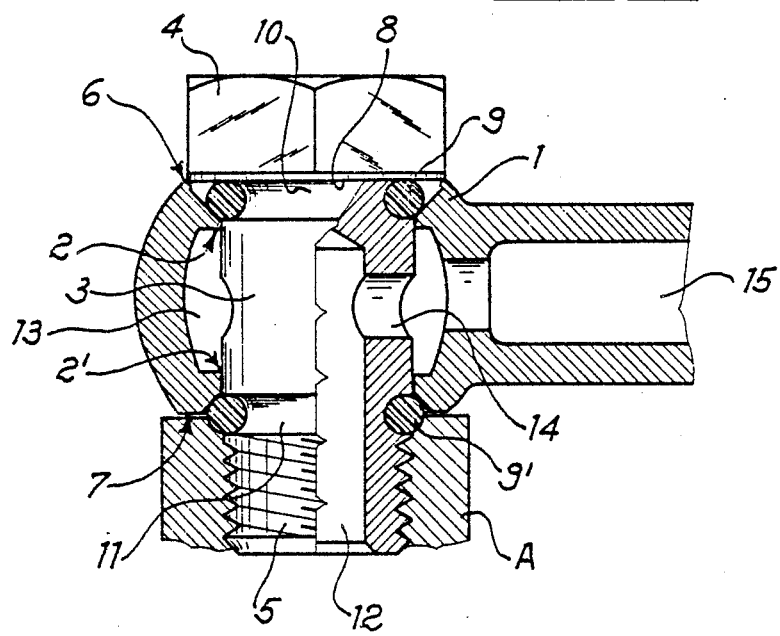
FIG. 1 shows the schematic view of a cross-section of this connection.
Figure 2:
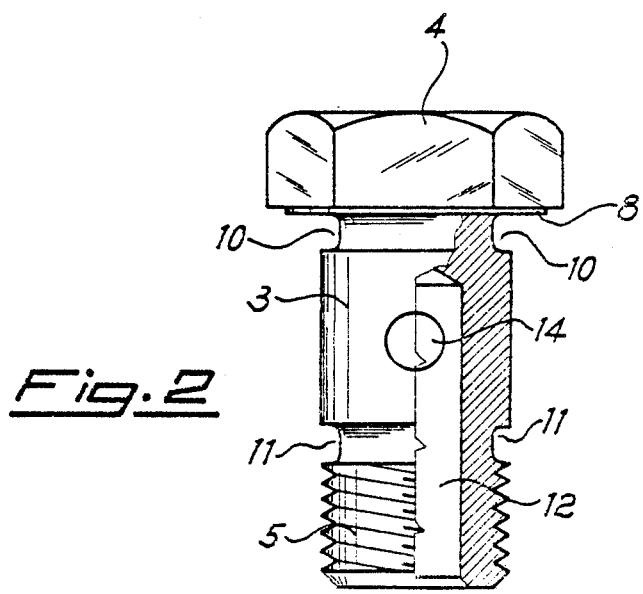
FIG. 2 shows the schematic view of a cross-section of the clamping screw.

With reference to the drawings, the connection for fluids comprises a movable eye type joint 1, provided, in the two upper and lower opposite faces 6 and 7, with parallel, coaxial through-holes 2 and 2'. In said holes 2 and 2' is inserted the shank 3 of a screw. The head 4 of the screw, preferably of faceted type, and its threaded end 5, project respectively from the opposite parallel faces 6 and 7 of joint 1. The through-holes 2 and 2' have a conic or truncated cone shape with diameter increasing towards the external surface of faces 6 and 7. Correspondingly, the shank 3 of the screw is provided with a first round groove 10, obtained near the lower face 8 of the head 4, and a second round groove 11, parallel to the first, obtained near its threaded zone 5 and substantially corresponding to the lower face 7. Said round grooves 10 and 11 have preferably a U-shaped, as illustrated in FIG. 2, which can be more easily obtained, guaranteeing at the same time excellent seal and vibration strength. In each groove 10 and 11 a round gasket 9 and correspondingly 9' is positioned. In clamping phase, said gaskets 9 and 9', besides being contained in round grooves 10 and 11, are engaged in the conic surface of the through-holes 2 and 2', guaranteeing perfect adherence and seal. The round gaskets 9 and 9' are preferably of the type with circular cross-section and are constructed in flexible material, e.g. an elastomeric material. The leg 3 of the screw is fitted with a central duct 12 which communicates with the internal chamber 13 of the movable joint 1 through at least one transversal hole 14. The internal chamber 13 is in turn connected to the tubular duct 15, connected to joint 1. The axis of said tubular duct 15 is substantially perpendicular to that of the through-holes 2 and 2'. As can be understood from what has been illustrated and described, all components of the joint are pre-assembled to one another, and, to instal them, it is sufficient to screw the threaded part 5 into the corresponding threaded hole of the duct or container A from which it comes, or in which the fluid to be conveyed is sent. During clamping, all components remain in their alignment position, and, finally, it is sufficient to tighten the screw firmly, but with a normal clamping load, until gasket 9 is squashed and pressed between its seat 10, the lower plane 8 of the head 4 and the conic surface of the upper hole 2, and the gasket 9' is squashed and pressed between its seat 11, the conic surface of the lower hole 2' and the surface of the duct or container A on which the movable joint 1 is fixed. In these conditions, gasket seal is guaranteed, like the connection of the parts to be put in communication, and the coupling operation takes place simply, rapidly and safely.

What is claimed is:

1. A fluid connector for a conduit (A) having a threaded opening and a surface at one end; comprising:
   (a) mobile joint (1) having opposite parallel faces (6,7), said joint being provided with an internal chamber (13), a lateral tubular duct (15) fixed to the joint and communicating with said chamber, two coaxial and opposite through-holes (2) and (2') having an inner surface of conical shape, the axis of said through-holes being substantially perpendicular to the axis of the tubular duct (15), said through-holes being formed on said opposite faces of said joint;
   (b) a clamping screw having a head (4) with a lower face (8) and threaded portion (5) for coacting with said threaded opening, said screw having a shank (3), said shank being inserted in said through-holes (2) and (2') of the joint (1), said shank (3) being provided with a central duct (12) which is coaxial with said axis of said through-holes and communicating with said chamber (13) by means of at least one transversal hole (14) and two round parallel grooves (10) and (11), one groove (10) being formed in the proximity of said lower face (8) of said head (4), the other groove (11) being formed in the proximity of said threaded portion of said screw;
   (c) flexible round seal gaskets (9) and (9') inserted in said round grooves (10) and (11) of the clamping screw and the gasket (9) being placed between said lower face (8) and the conical surface of one of said holes (2), the gasket (9') is placed between the conical surface of the other hole (2') and said surface at said one end of the conduit (A) to be coupled by threaded engagement with said clamping screw.

2. The connector according to claim 1 wherein said round gaskets (9) and (9') are of elastomeric material.

3. The connector according to claim 1 wherein said joint (1) has a symmetrical shape with respect to the axis of the lateral duct (15).

4. The connector according to claim 1 wherein the round grooves (10,11) have a U-shaped section.

5. The connector according to claim 1 wherein the movable joint (1), the screw formed by the head (4), the shank (3), the threaded portion (5) and the two gaskets (9) and (9') are pre-assembled to one another in the exact working position.

* * * * *